No. 705,120. Patented July 22, 1902.
J. McVEY.
NUT LOCK.
(Application filed July 17, 1901.)
(No Model.)
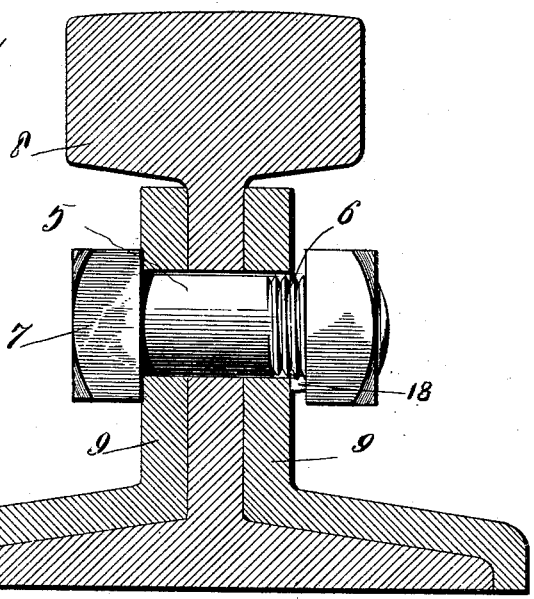

UNITED STATES PATENT OFFICE.

JOHN McVEY, OF LONGUE POINTE, CANADA.

NUT-LOCK.

SPECIFICATION forming part of Letters Patent No. 705,120, dated July 22, 1902.

Application filed July 17, 1901. Serial No. 68,569. (No model.)

*To all whom it may concern:*

Be it known that I, JOHN McVEY, a subject of His Majesty the King of Great Britain, residing at Longue Pointe, county of Laval, Province of Quebec, Canada, have invented certain new and useful Improvements in Nut-Locks; and I do hereby declare that the following is a full, clear, and exact description of the invention, such as will enable others skilled in the art to which it appertains to make and use the same.

My invention relates to improvements in nut-locks; and the objects of the invention are to provide means operable by screwing the nut home against the work to set the fastener automatically into interlocking engagement with the threads of the bolt, to arrange the nut and fastener for mutual service in a manner to give a wedging action to the fastener, to simplify and cheapen the construction, and to provide for the easy and expeditious application of the fastener to the nut.

With these ends in view the invention consists in the novel combination, construction, and arrangement of parts, which will be hereinafter fully described and claimed.

In the drawings hereto annexed, forming a part of this specification, Figure 1 is a vertical transverse section through a railway-rail illustrating my improved nut-lock in elevation. Fig. 2 is a longitudinal sectional elevation in the vertical plane of the center of the nut shown by Fig. 1. Fig. 3 is a detail section through the nut. Fig. 4 is a perspective view of the fastener represented by Fig. 2. Figs. 5 and 6 are edge views of the fastener shown by Figs. 2 and 4. Fig. 7 is a sectional elevation of a bolt and a nut representing another type of fastener. Figs. 8 and 9 are views in perspective and in edge elevation, respectively, of the fastener shown by Fig. 7.

The same numerals of reference denote like parts in each of the several figures of the drawings.

5 designates a bolt having a threaded portion 6 and a head 7. This bolt is adapted to pass through the web of a railway-rail 8 and through the upright portions of the fish-plates 9. All these parts are similar to the parts comprising a railway-joint; but I would have it understood that my invention is not restricted to this special adaptation, because the improved nut-lock may be used on bolts employed in jarring machinery, bridgework, vehicles, and in fact any other place where nuts are liable to work loose from the bolts.

10 designates the nut, which is provided with the usual threaded opening 11, which nut is adapted to be screwed upon the threaded portion of the bolt in the ordinary way.

The nut is provided with a recess 16, which opens into or communicates with the threaded opening 11; but the recess does not extend entirely through the nut, and the bottom of the recess is given a decided slant or inclination, as indicated at 17 in Fig. 3. It is therefore to be understood that the recess 16 does not extend or open through the outer face of the nut and that the bottom 17 of said recess lies at an acute angle to the imaginary axis of the threaded opening.

The fastener 18 is in the form of a substantially triangular or wedge-shaped plate having a straight flat bottom edge 19, the angle of which corresponds to the bottom edge 17 of the recess or groove 16 in the nut shown by Fig. 3. The edges 20 and 21 of the fastener, which lie at right angles to each other, are beveled or inclined, as shown by Figs. 6 and 7, and the first-named edge is adapted to engage with the face of the work, while the last-named edge occupies a position to engage with the threads of the bolt. The fastener is adjusted in the recess 16 before the nut is screwed on the bolt, and this fastener rotates with the nut as the same is screwed toward the work, the inner beveled edge 20 of said fastener projecting beyond the inner face of the nut in order that it may engage with the work before the nut is fully screwed home. The stoppage of the fastener by engagement with the work forces the fastener into the recess of the nut, and as the bottom edge 17 of the recess is inclined it coöperates with the edge 19 of the fastener in a manner to force the beveled edge 21 of said fastener into the threads of the bolt. It will thus be understood that the tapered fastener is forced into the recessed nut and embedded in the threads of the bolt by a wedging action, and the fastener is thus made to have interlocking engagement with the bolt, the nut, and with the work, because the beveled edge 21 of the fastener is embedded in mutilated threads of the bolt. The inclined edge 19 of the fastener is seated in the recess of the nut and the beveled edge 20 of the fastener bites into the exposed surface of the work, whereby the fastener securely locks the nut against turning on the bolt.

In the embodiment of the invention shown by Figs. 7, 8, and 9 the bolt and the nut are the same as heretofore described, but the construction of the key is modified somewhat, although in general it has the appearance of Figs. 4, 5, and 6. The fastener 22 has an inclined bottom edge 23 and a beveled rear edge 24, which correspond to the edges 19 20, respectively, of the fastener 18. The remaining edge 25 of the fastener is cut away, as at 26, thus leaving the active edge 25 quite short. The fastener is inserted in the recess 16 of the nut in the same way as the fastener 18 is applied to the bolt of Fig. 2. The inner edge 24 projects beyond the inner face of the nut, whereas the active beveled edge rests against the threads of the bolt; but the inactive edge 26 is free from contact with the bolt. This construction of the fastener reduces the frictional engagement thereof with the bolt-threads; but when the nut approaches the work and the edge 24 of the fastener engages with said work the fastener is forced by a wedging action between the nut and the edge 23, so that the active edge 25 of the fastener will be embedded into certain threads of the bolt.

It is thought that the operation of this invention will be readily understood from the foregoing description taken in connection with the drawings.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a nut-lock, the combination with a bolt, of a nut provided with a groove which intersects with the threads in an opening thereof, said groove having an inclined bottom, and a tapering fastener fitted in said groove for an inclined edge of the fastener to engage with the corresponding bottom of the groove, the inner end of the fastener being extended beyond the inner face of the nut and the active edge of the fastener occupying opposing relation to the threads of the bolt, said inner end of the fastener and the active edge thereof being beveled, substantially as described.

2. In a nut-lock, the combination with a bolt, of a nut provided with a radial groove which has a sloping bottom, and a fastener fitted in said groove and having a beveled inner edge and an active edge which is beveled and is in opposing relation to the threads of the bolt, substantially as described.

3. In a nut-lock, the combination with a threaded bolt, of a nut provided with a radial groove having an inclined bottom and a wedge-like fastener seated in said groove with its inner end extending beyond the inner face of the nut, and having its active edge beveled and disposed in opposing relation to the threads of the bolt, substantially as described.

In witness whereof I have hereunto set my hand in the presence of two witnesses.

JOHN McVEY.

Witnesses:
J. A. MARION,
T. MYNARD.